US012610896B2

(12) United States Patent
Burch

(10) Patent No.: US 12,610,896 B2
(45) Date of Patent: Apr. 28, 2026

(54) DECONSTRUCTABLE PLANT POT

(71) Applicant: Kenneth A Burch, Mesa, AZ (US)

(72) Inventor: Kenneth A Burch, Mesa, AZ (US)

( * ) Notice: Subject to any disclaimer, the term of this patent is extended or adjusted under 35 U.S.C. 154(b) by 0 days.

(21) Appl. No.: 18/915,184

(22) Filed: Oct. 14, 2024

(65) Prior Publication Data

US 2026/0101853 A1 Apr. 16, 2026

(51) Int. Cl.
A01G 9/08 (2006.01)
A01G 9/02 (2018.01)

(52) U.S. Cl.
CPC .............. A01G 9/088 (2013.01); A01G 9/02 (2013.01); A01G 9/0302 (2025.01)

(58) Field of Classification Search
CPC ......... A01G 9/02; A01G 9/0302; A01G 9/088
See application file for complete search history.

(56) References Cited

U.S. PATENT DOCUMENTS

| | | | | |
|---|---|---|---|---|
| 473,836 | A | * | 4/1892 | Goodacre ............ A01G 9/0295 47/73 |
| 2,594,307 | A | * | 4/1952 | Valenzuela ............ A01G 9/029 47/73 |
| 3,991,516 | A | * | 11/1976 | Cicero ...................... A01G 9/02 47/87 |
| 4,216,622 | A | * | 8/1980 | Hollenbach .............. A01G 2/20 47/73 |
| 5,099,608 | A | * | 3/1992 | Casey .................... A01G 9/086 47/76 |
| 5,359,809 | A | * | 11/1994 | Johnson ................. A01G 23/04 220/4.24 |
| 6,367,194 | B1 | * | 4/2002 | Measday .................. A01G 9/28 47/33 |
| 2003/0097790 | A1 | * | 5/2003 | Vahrmeyer .............. A47G 7/06 47/66.2 |

FOREIGN PATENT DOCUMENTS

| | | | | | |
|---|---|---|---|---|---|
| GB | 2580286 | A | * | 7/2020 | .......... A01G 9/0302 |
| KR | 840002701 | Y1 | * | 12/1984 | .......... A01G 9/0302 |
| KR | 20220003487 | A | * | 1/2022 | .......... A01G 9/0302 |
| WO | WO-2025126199 | A1 | * | 6/2025 | .......... A01G 9/0302 |

* cited by examiner

*Primary Examiner* — Ebony E Evans

(74) *Attorney, Agent, or Firm* — Etherton Law Group, LLC

(57) ABSTRACT

This deconstructable plant pot overcomes the problems with soil and root disruption during transplanting. At its simplest, the pot has three parts: two curved sidewalls and a base. The sidewalls can be attached and detached from each other. The sidewalls are connected by sliding them together along their vertical edges. When they are attached they form a hollow body, which can be attached and detached from the base by twisting the base on and off the lower portion of the hollow body.

1 Claim, 11 Drawing Sheets

FIG. 7A                    FIG. 7B

DECONSTRUCTABLE PLANT POT

FIELD OF INVENTION

This invention relates generally to plant pots. This invention relates particularly to a plant pot that is deconstructable to ensure the roots and soil of a plant to be transplanted do not come apart when transplanting the plant into a larger pot.

BACKGROUND

Potted plants often need to be transplanted into a larger pot to give the roots room to grow, allowing the plant to access more nutrients and water. This can lead to healthier and larger plant growth over time. A main challenge when transferring a live plant to a new pot is to keep the roots and soil of a plant together, to avoid breaking roots off and other disruption of the root ball.

The conventional process for transplanting a potted plant is to place one hand over the dirt in the pot with the main stem of the plant between the first two fingers, turn the pot upside down, tug the pot up off the root ball with the other hand, turn the plant upright again, set it in a new pot, and add dirt to the new pot to backfill the new pot with enough soil to cover the plant up to the stem. During this process the roots and the dirt in the old pot often separate so that when the plant is placed in the new pot, the soil and roots that were formerly next to the sidewall of the old pot are loosened so that the roots are separated from the soil that used to surround them. This damages the roots by breaking the nutrient transport channels and exposes them to dry air which can dehydrate them. Some plants succumb to transplant shock from this and die.

It would be desirable to be able to transplant a potted plant without disrupting the roots and soil. It would be desirable to have a pot that facilitates healthy transplantation and that is reusable.

SUMMARY OF THE INVENTION

This deconstructable plant pot overcomes the problems with soil and root disruption during transplanting. At its simplest, the pot has three parts: two curved sidewalls and a base. The sidewalls can be attached and detached from each other. The sidewalls are connected by sliding them together along their vertical edges. When they are attached they form a hollow body, which can be attached and detached from the base by twisting the base on and off the lower portion of the hollow body.

To transplant a plant that has outgrown its current deconstructable pot, add soil to the bottom of a larger pot. Twist off the base of the smaller deconstructable pot that has the plant in it and place the smaller pot on top of the soil in the larger pot. Add soil around the perimeter between the smaller deconstructable pot and larger pot. Slide a first sidewall of the smaller deconstructable pot upward while pressing gently down on the top of the soil with the other hand, separating the two sides of the smaller deconstructable pot and removing the first sidewall from the pot. Slide the second sidewall of the smaller deconstructable pot upward while holding down the top of the soil with the other hand, removing the second sidewall from the pot.

DETAILED DESCRIPTION OF THE INVENTION

The plant pot of the present invention can be deconstructed while the plant is in the pot without disturbing the soil and roots. The pot comprises at least two curved sidewalls and a base. The pot can be constructed or reconstructed from these parts to be reused to hold a new plant.

Figure 1:
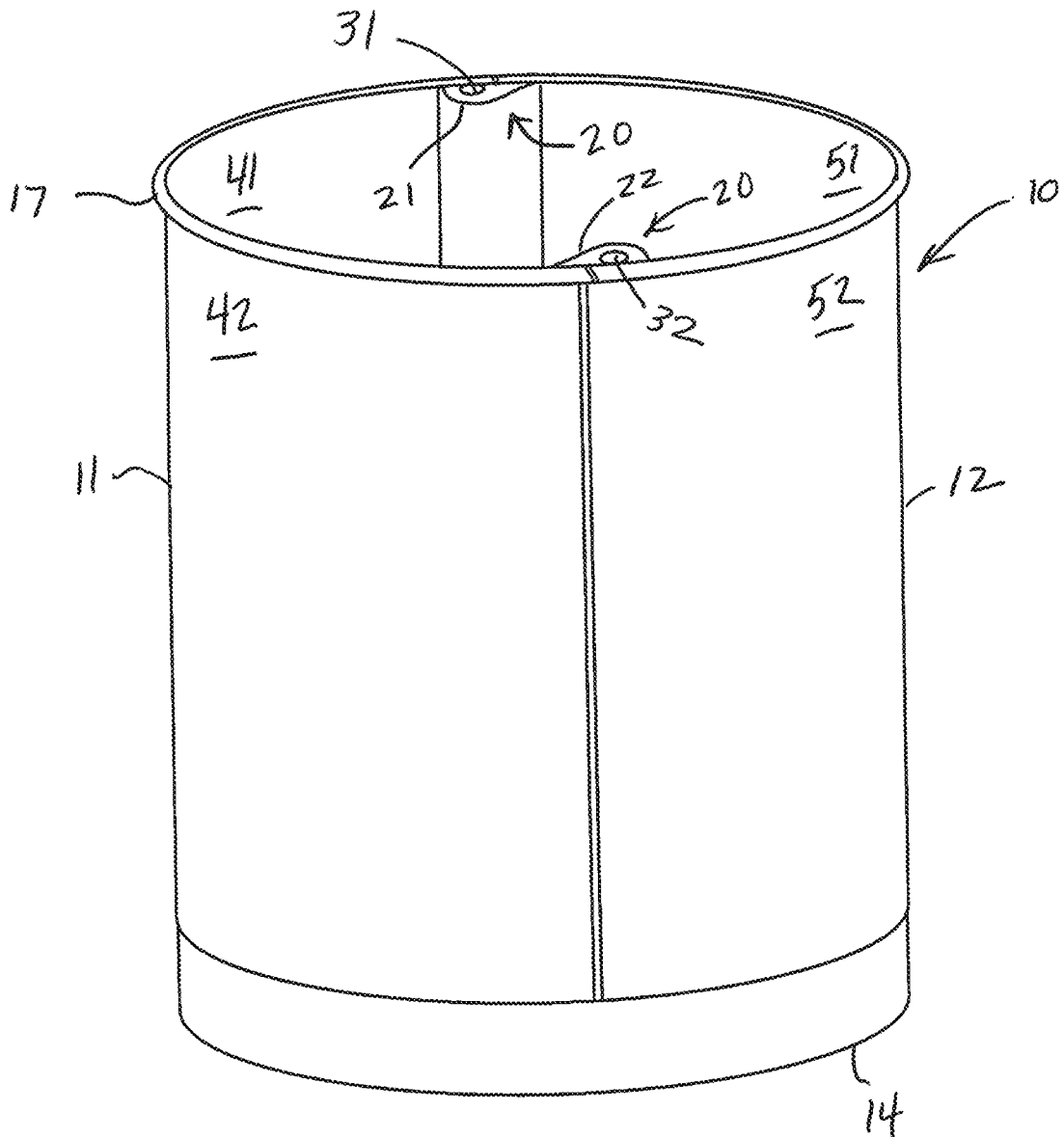
FIG. 1 is top perspective view of the deconstructable pot with parallel sides.

FIG. 1 shows a top perspective view of the deconstructable plant pot. The pot has a first sidewall 11, a second sidewall 12, and a base 14. Each sidewall has a top edge 4, a bottom edge 5, a first side edge 6, and a second side edge 7. The sidewalls 11, 12 are held together with sidewall fasteners 20 and once fastened together form a hollow body 10. Once the hollow body 10 is formed, the base 14 is twisted onto the body 10 and held in place with twist fasteners 24, closing the bottom end of the hollow body 10 completing the pot.

Figure 2:
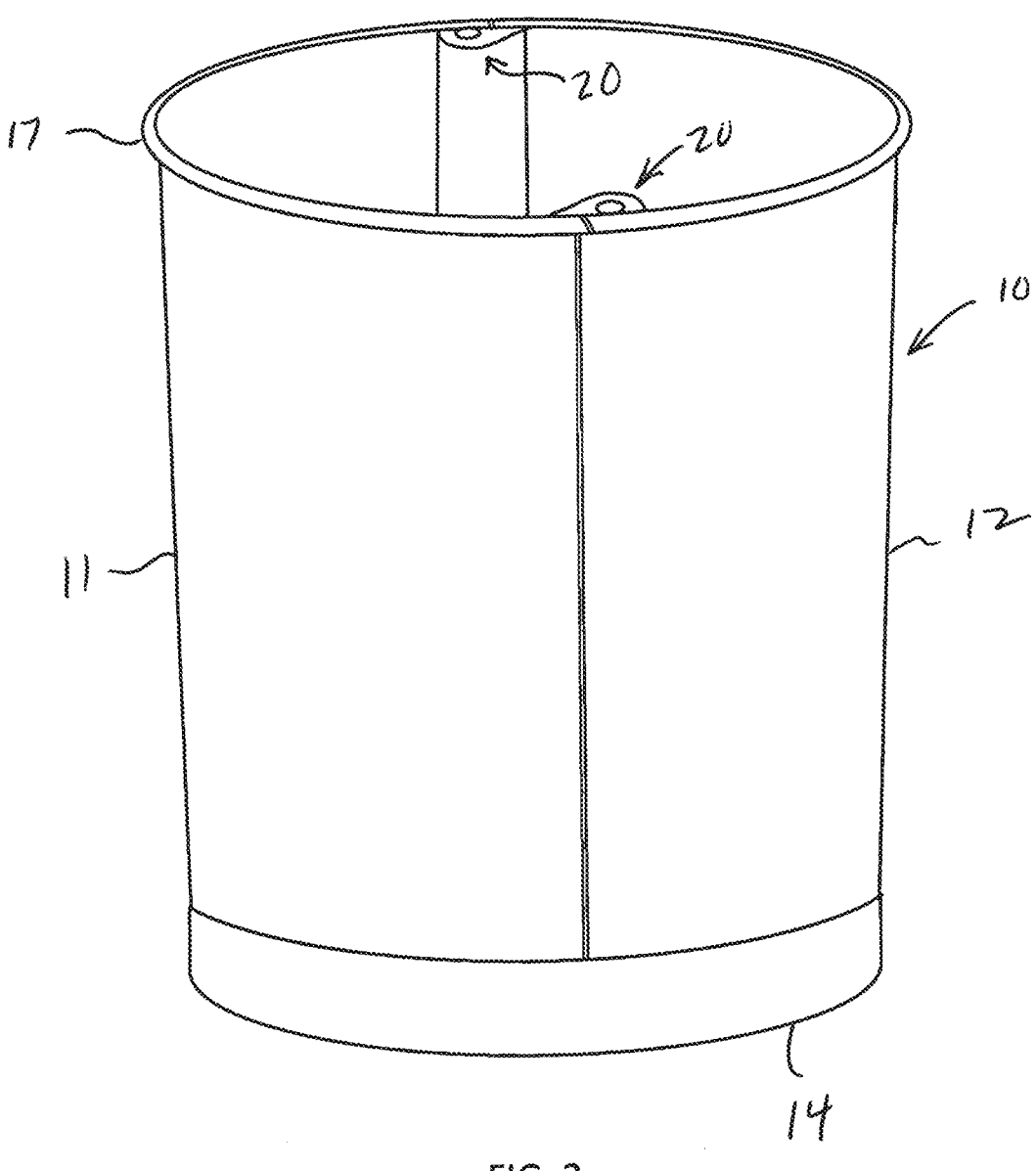
FIG. 2 is top perspective view of the deconstructable pot having a frustoconical hollow body.

The sidewalls 11, 12 are concave so that when they are connected to each other they form a hollow body 10 with a circular perimeter. Two sidewalls 11, 12 are shown throughout the figures, but the hollow body 10 may be made of more than two sidewalls, each defining a portion of the hollow body 10. The hollow body 10 may be cylindrical with parallel sides as shown in FIG. 1 or frustoconical as shown in FIG. 2. The frustoconical body lends itself to pots that fit inside each other and are therefore more easily stacked than pots with parallel sides. Each sidewall 11, 12 has an inside face 41, 42 respectively, and an outside face 51, 52 respectively. Optionally a flange 17 extends outward from the top edge of each sidewall to form a top rim 15 on the pot. This top rim 15 increases rigidity of the sidewalls and pot and provides a handle of sorts to grab the pot once it is formed.

The bottom portion of each sidewall is referred to herein as a footer 16. The height of the footer 16 measured from the bottom edge of the side wall relative to the total height of the sidewalls varies depending on various factors including the visual aesthetic of the pot, the area necessary for good contact between the base 14 and the hollow body 10, and the desired rigidity of the base 14. The footer 16 may range from about 1%-25% of the height of the sidewalls. The footer 16 is configured with twist fasteners 24 that enable the base 14 to be connected to and disconnected from the hollow body 10 with a twisting motion.

Figure 3:
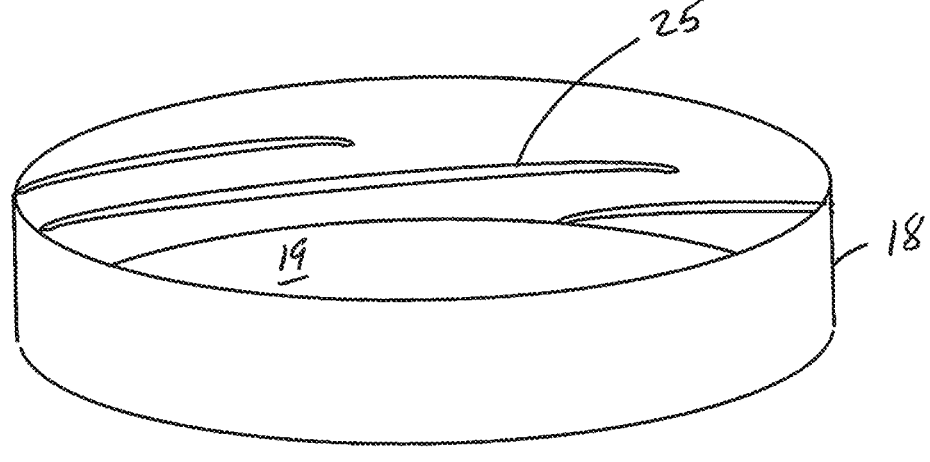
FIG. 3 illustrates a base with a threaded twist fastener.
Figure 4:
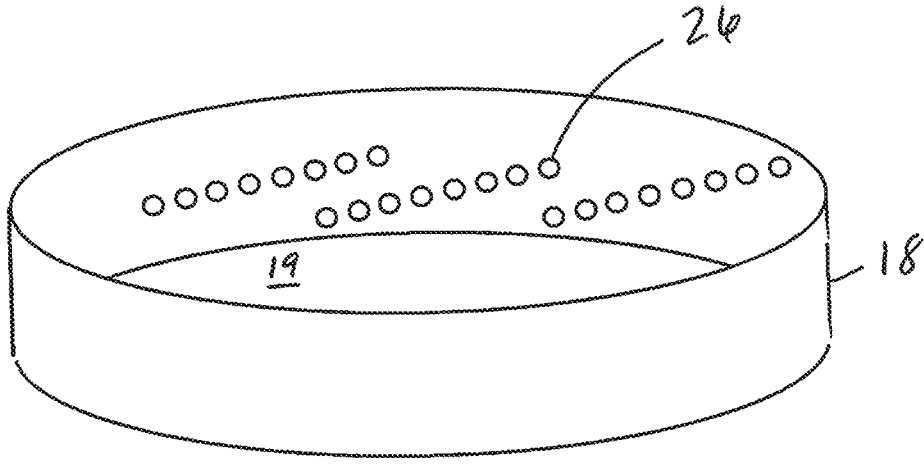
FIG. 4 illustrates a base with an alternative twist fastener.
Figure 11:
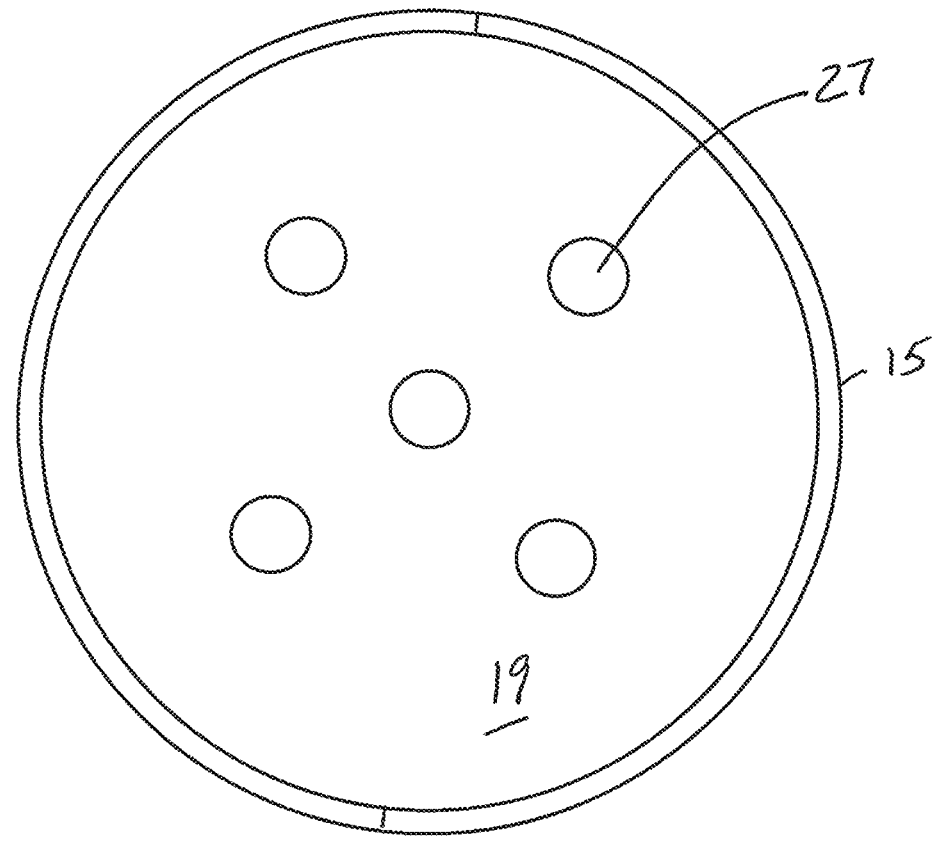
FIG. 11 is a bottom view of an alternative embodiment of the deconstructable pot.

The base 14 is a circular band 18 connected to a solid surface 19, like an upside-down bottle screw cap. FIG. 3 shows one embodiment of the base with threaded twist fasteners and FIG. 4 shows an alternative embodiment of the base with ramped detents. The base 14 may have openings 27 to let water run out of the pot as shown in FIG. 11. The openings 27 may be few or many and spaced in any pattern.

Figure 5:
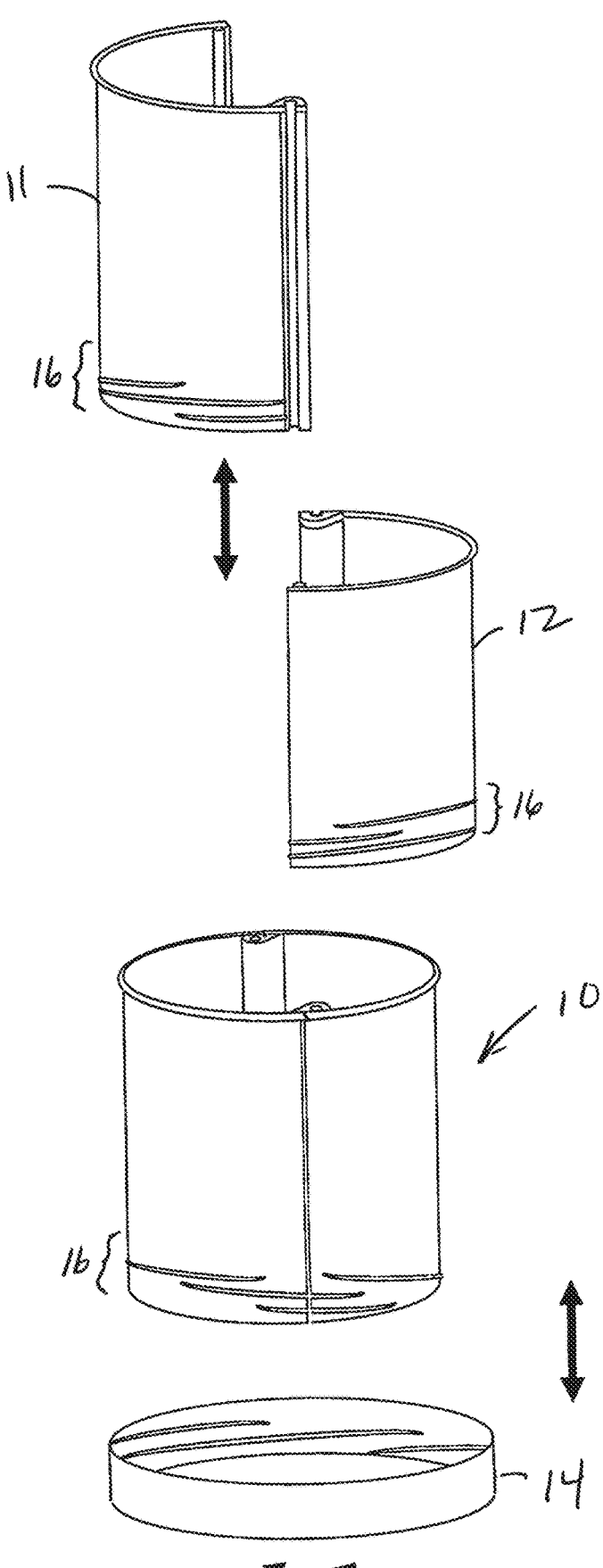
FIG. 5 is an exploded view of a first embodiment of the deconstructable pot.
Figure 6:
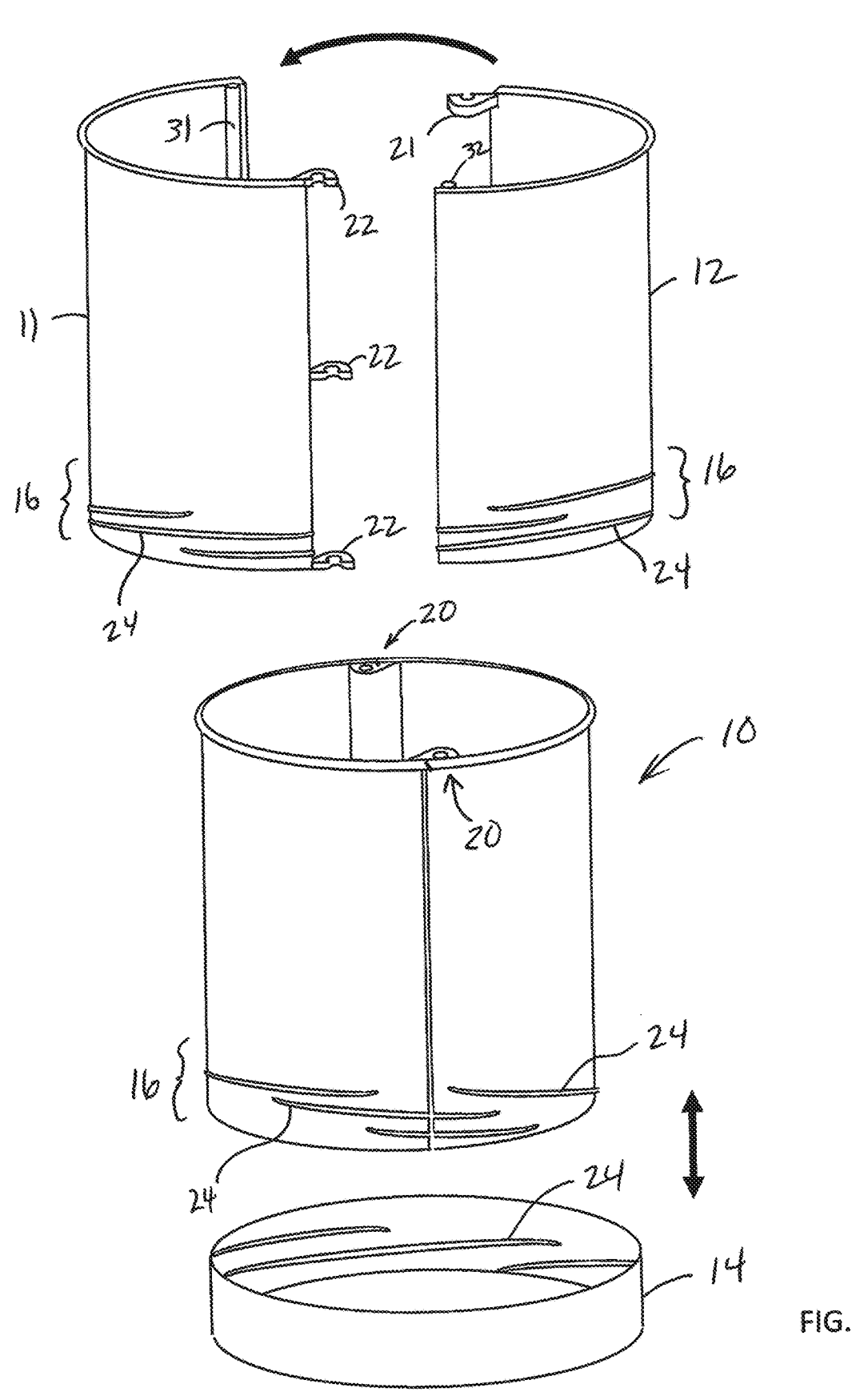
FIG. 6 is an exploded view of a second embodiment of the deconstructable pot.

The sidewall fasteners 20 comprise a key 31, 32 on each sidewall 11, 12 respectively. Each key 31, 32 releasably fits into a key receiver 21, 22 respectively, which allow the sidewalls 11, 12 to be connected to each other by sliding them vertically into each other or deforming the key receiver to receive the key. FIGS. 5 and 6 shows an embodiment in which each key 31, 32 is a solid cylinder that runs the length of a first side edge of each sidewall 31, 32. In some embodiments each key 34, 35 is a shorter cylinder that does not run the length of the sidewall side edge. FIG. 5 shows a key receiver the runs the length of a first side edge of each sidewall 31, 32. FIG. 6 shows key receivers that are truncated and do not run the length of the side edge. Instead they are placed strategically along the side edge.

Figure 7:
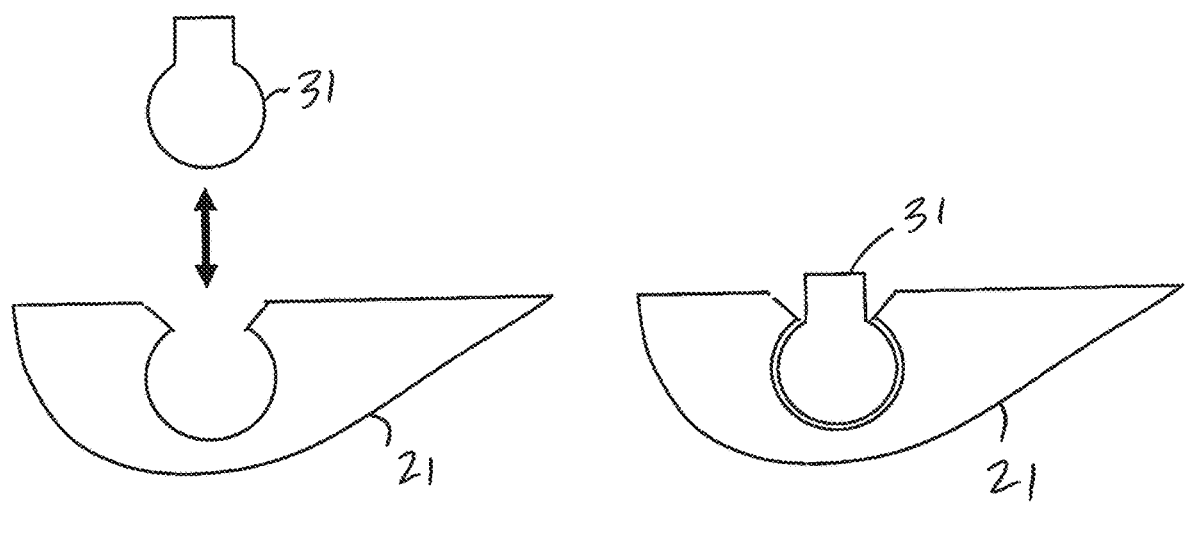
FIG. 7A illustrates an exploded top view of the cylinder and hook fastener.
FIG. 7B illustrates a top view of the cylinder and hook fastener.

The key receiver 21, 22 is mated to receive the key 31, 32. Different shapes of mated receiver and key may be used. In one embodiment the key is cylindrical and mates with a key receiver that has a circular aperture to receive the key. See FIGS. 7A-B. Instead of a cylinder type key and key receiver, the key may be rectangular, cruciform, or otherwise polygonal, with a mated aperture in the key receiver.

The twist fasteners 24 comprise mated structures on the footer 16 and the band 18. Preferably the twist fasteners 24 are screw threads 25 as shown in FIGS. 3, 5, and 6, but may also include other structures such as ramped embossed or debossed mated bumps and detents. FIG. 4 shows the base 14 with embossed bumps 26 that would releasably seat in debossed recesses in a mated footer 16.

Both the sidewall fasteners 20 and the twist fasteners 24 can be connected and disconnected without damaging the fasteners, the sidewalls, or the base. In this way the components of the deconstructable pot can be separated and connected repeatedly so that the pot components are reusable and replaceable. If one sidewall cracks it can be replaced with another sidewall.

In a preferred embodiment, each sidewall 11, 12 is identical to the other so both sidewalls can be made from a single plastic mold. In other embodiments the sidewalls may be different from each other in some features, for example with ornamental embossing or debossing, embossing or debossing for structural rigidity, or different types of sidewall fasteners at each attachment in a given pot.

To transplant a plant that has outgrown its current deconstructable pot, add soil to the bottom of a larger pot. Twist off the base 14 of the smaller deconstructable pot that has the plant in it and place the smaller pot on top of the soil in the larger pot, with the top of the smaller deconstructable pot just below the top edge of the larger pot. Add soil around the perimeter between the smaller deconstructable pot and larger pot. Slide a first sidewall 11 of the smaller deconstructable pot upward while pressing gently down on the top of the soil with the other hand, separating the two sides of the smaller deconstructable pot and removing the first sidewall 11 from the pot. Slide the second sidewall 12 of the smaller deconstructable pot upward while holding down the top of the soil with the other hand, removing the second sidewall 12 from the pot. The pressure from the new perimeter soil with help keep the soil and roots of the plant from being disrupted. If the larger pot is also a deconstructable pot, the process can be repeated when the plant outgrows its new pot. The smaller deconstructable pot can be reused for new plants.

Figure 8:
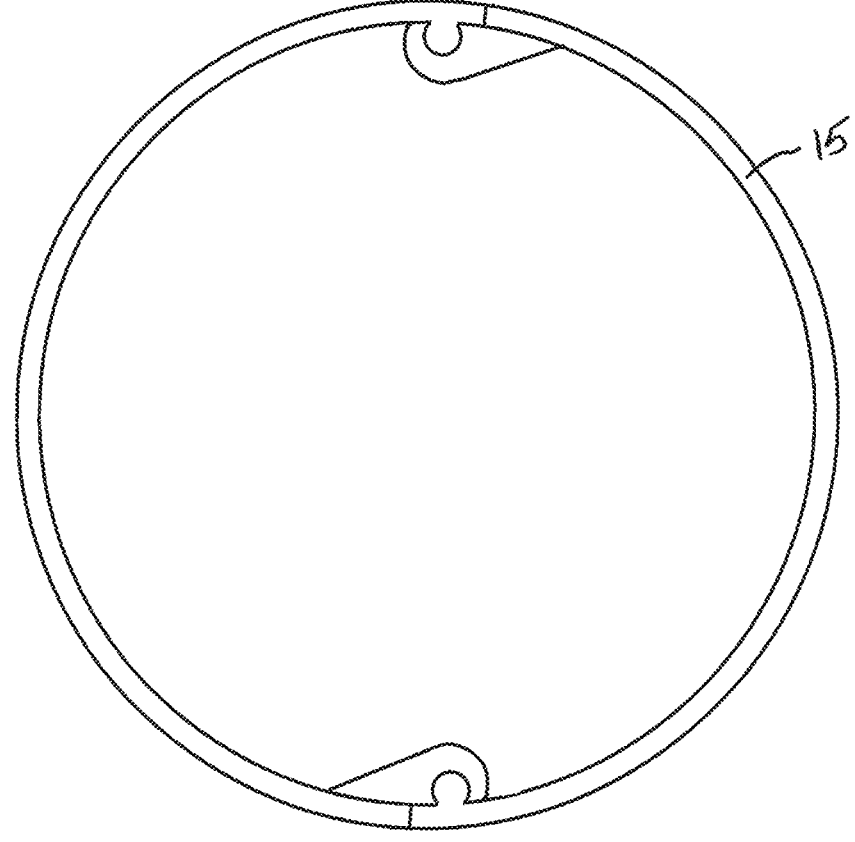
FIG. 8 is a top view of the deconstructable pot.
Figure 9:
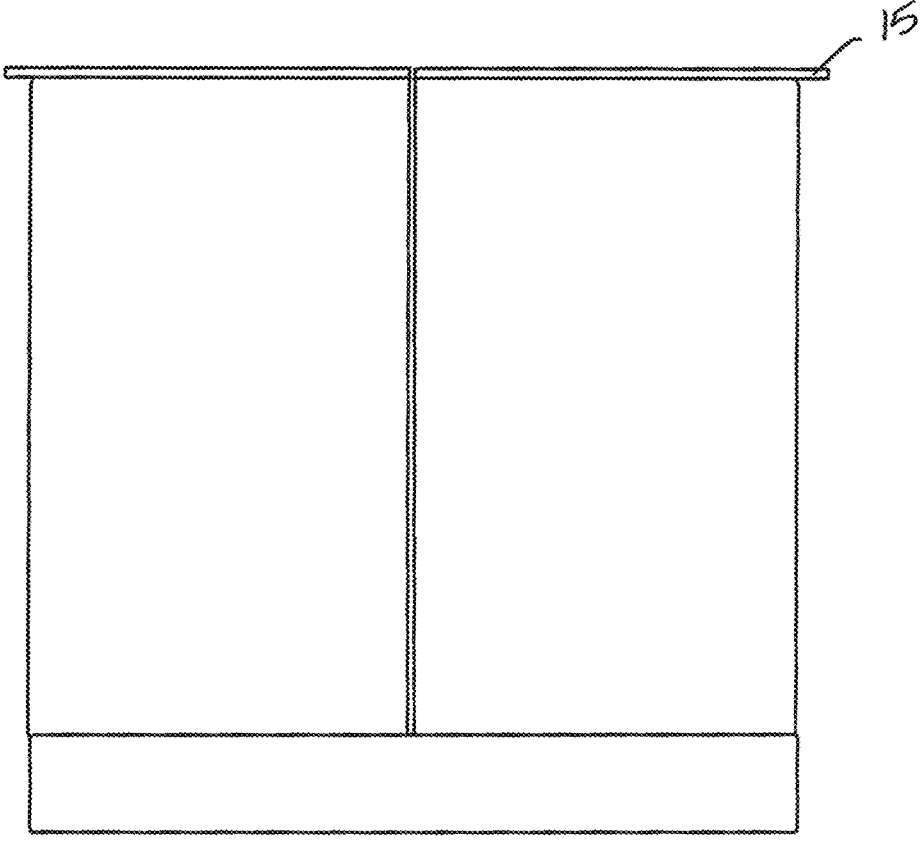
FIG. 9 is a right side view of the deconstructable pot.
Figure 10:
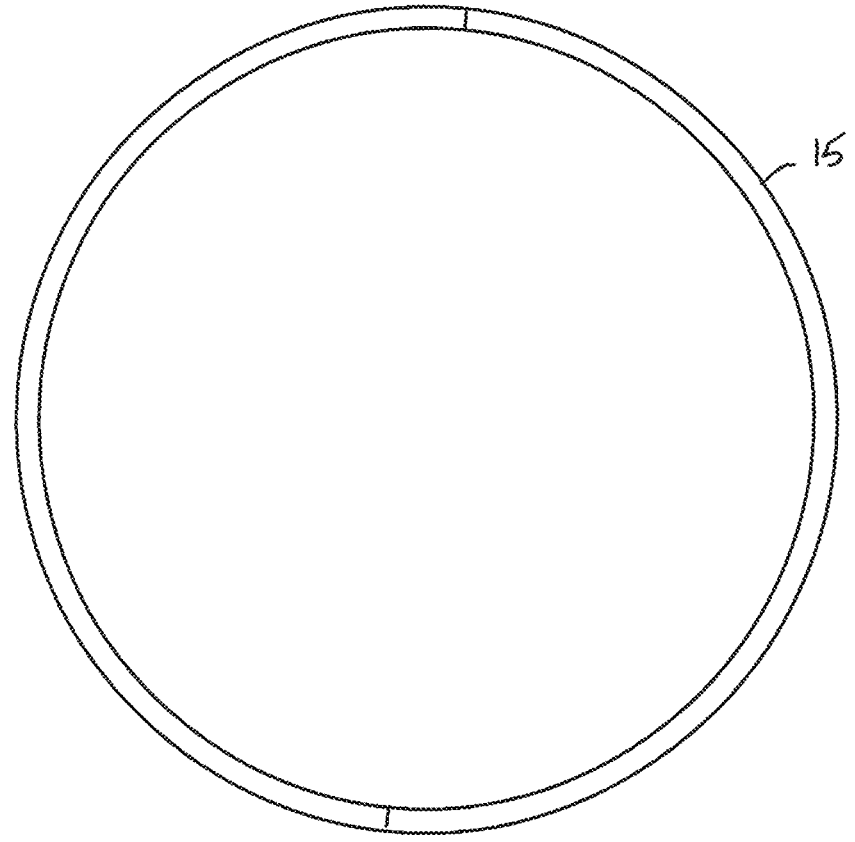
FIG. 10 is a bottom view of the deconstructable pot.

FIG. 8 shows a top view of the pot. FIG. 9 shows a right side view of the deconstructable pot; the left side of the pot looks identical to the right side of the pot. FIG. 10 is a bottom view of the deconstructable pot and FIG. 11 is a bottom view of an alternative embodiment of deconstructable pot.

The deconstructable pot can be made of any material including plastic, wood or metal, but is preferably plastic for its light weight and durability. The plastic should be of sufficient thickness and density to support the desired rigidity of the key and fasteners. The pot components can be made by thermoforming, blow molding, injection molding, other method, or a combination thereof. The deconstructable pot can be made in any size, from 2″ diameter seedling pots to 30 gallon nursery pots.

Figure 12:
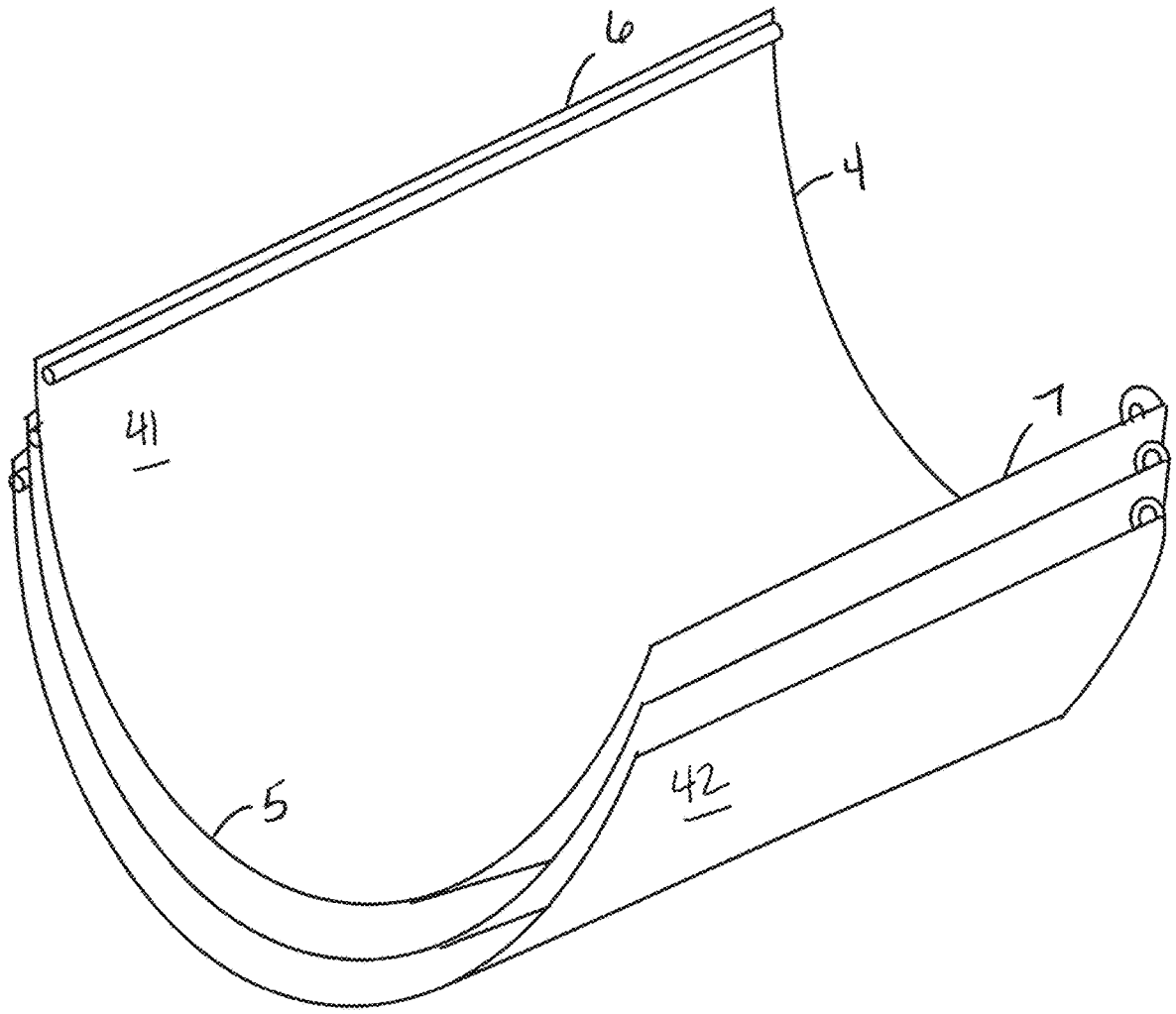
FIG. 12 illustrates a perspective view of three sidewalls stacked on each other.

A kit for the deformable pot comprises multiple sidewalls stacked on top of each other so that the outside surface of one sidewall rests inside the inside surface of another sidewall, and multiple bases. FIG. 12 shows three sidewalls stacked on each other. For clarity, the flange and twist fasteners in the footer are not shown. In one example, a kit may comprise 24 sidewalls and 12 bases. However, in a given kit the number of bases does not necessarily need to be half the number of sidewalls, allowing for replacement sidewalls and bases. For example a kit may contain 27 sidewalls and 12 bases.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method of transplanting a plant from a deconstructable pot comprising a base, a first curved sidewall interconnected with a second curved sidewall forming a body into a pot larger than the deconstructable pot, the method comprising:
    a. adding soil to the larger pot;
    b. twisting off the base of the deconstructable pot that has the plant in it, leaving the plant in the body;
    c. placing the body on top of the soil in the larger pot;
    d. adding soil around the body in the larger pot;
    e. sliding a first sidewall of the body vertically upward to separate it from a second sidewall of the body;
    f. removing the first sidewall from the larger pot; and
    g. sliding the second sidewall vertically upward and removing it from the larger pot.

* * * * *